No. 759,517. PATENTED MAY 10, 1904.
A. G. HOHENSTEIN.
STEAM BOILER.
APPLICATION FILED JUNE 1, 1903.
NO MODEL. 7 SHEETS—SHEET 3.

WITNESSES:
Herbert Bradley
Fred Kirchner.

INVENTOR
Archie G. Hohenstein
by Christy and Christy
Att'ys

No. 759,517. BEST AVAILABLE COPY PATENTED MAY 10, 1904.
A. G. HOHENSTEIN.
STEAM BOILER.
APPLICATION FILED JUNE 1, 1903.

NO MODEL. 7 SHEETS—SHEET 5.

WITNESSES:
Herbert Bradley
Fred Kirchner

INVENTOR
Archie G. Hohenstein
by Christy and Christy
Att'ys

BEST AVAILABLE COPY
No. 759,517. PATENTED MAY 10, 1904.
A. G. HOHENSTEIN.
STEAM BOILER.
APPLICATION FILED JUNE 1, 1903.
NO MODEL. 7 SHEETS—SHEET 6.
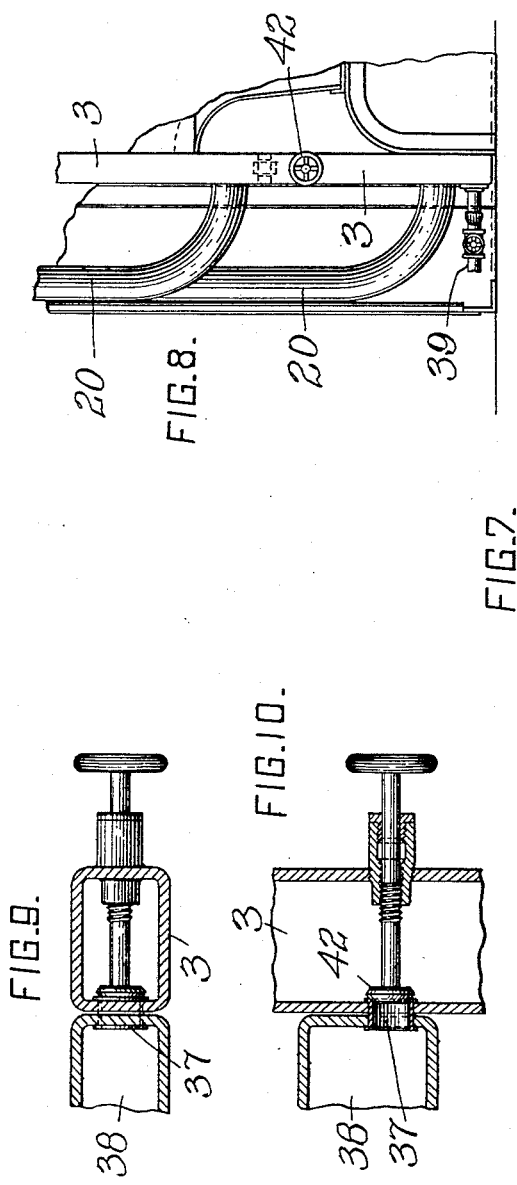
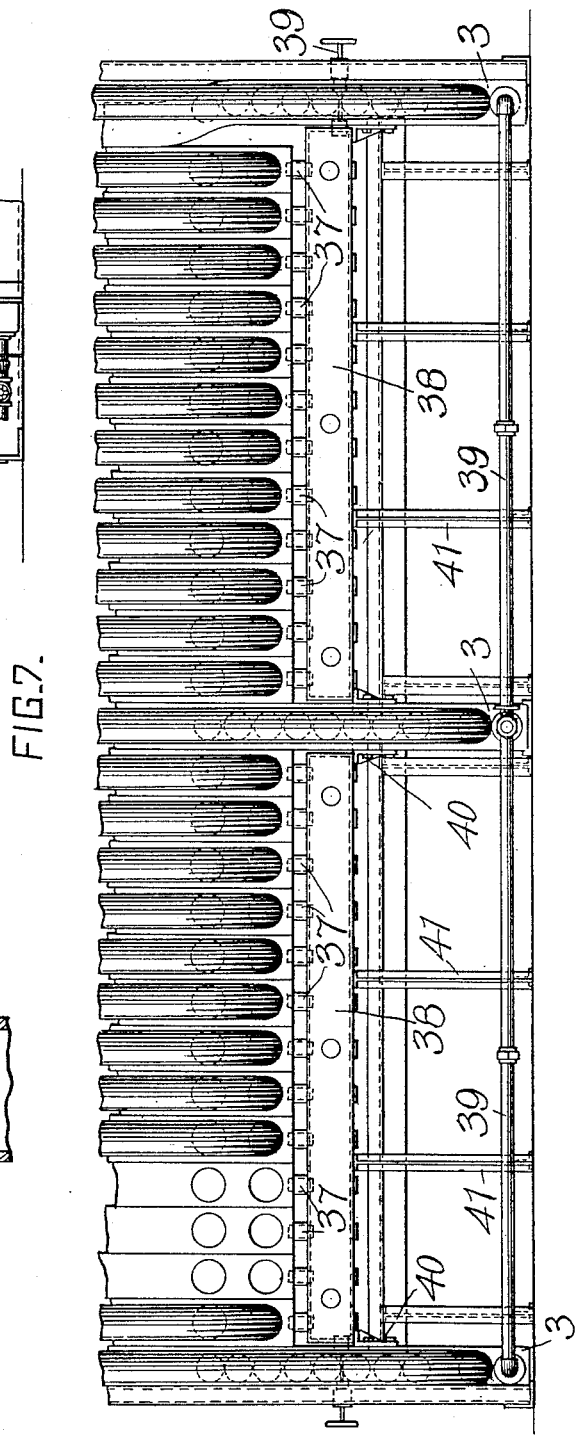
WITNESSES:
Herbert Bradley.
Fred Kirchner.
INVENTOR
Archie G. Hohenstein
by Christy and Christy
Att'ys No. 759,517. PATENTED MAY 10, 1904.
A HOHENSTEIN.
AM BOILER.
APPLI N FILED JUNE 1, 1903.
NO MODEL. 7 SHEETS—SHEET 7.
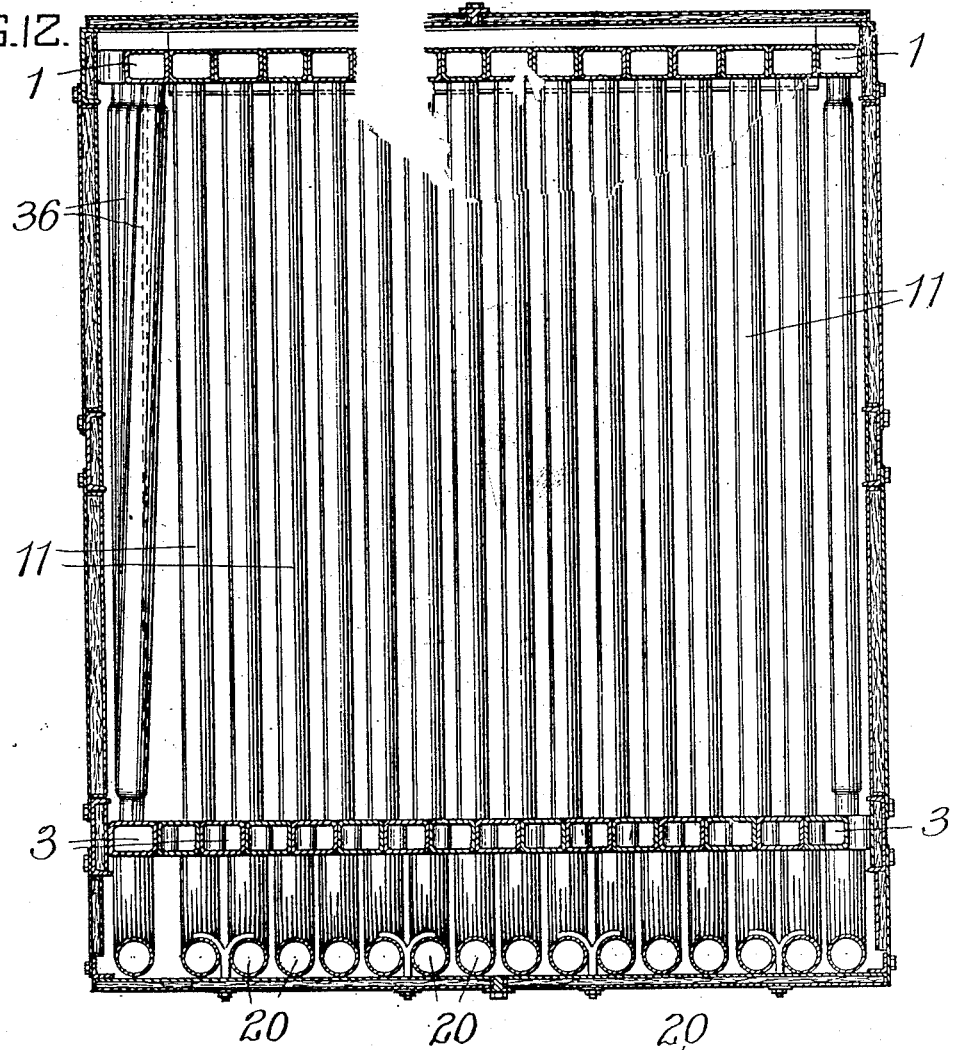
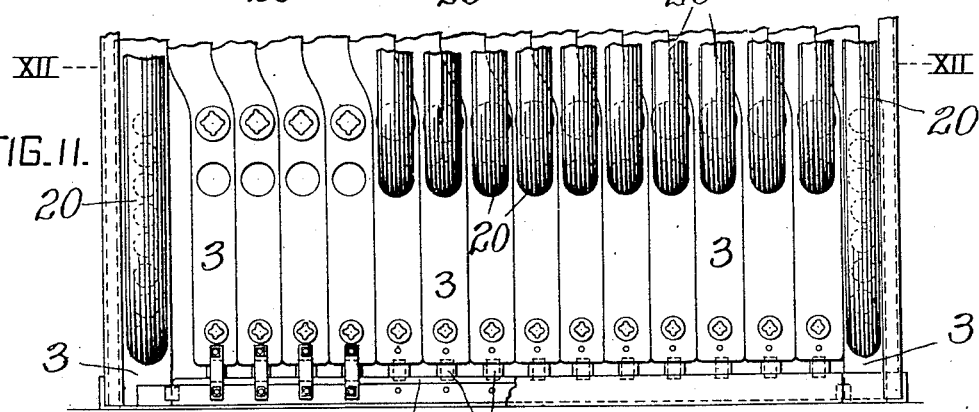
WITNESSES: Herbert Bradley, Fred Kirchner.
INVENTOR
Archie G. Hohenstein
by Christy and Christy
Att'ys No. 759,517. Patented May 10, 1904.

UNITED STATES PATENT OFFICE.

ARCHIE G. HOHENSTEIN, OF NEW HAVEN, CONNECTICUT.

STEAM-BOILER.

SPECIFICATION forming part of Letters Patent No. 759,517, dated May 10, 1904.

Application filed June 1, 1903. Serial No. 159,681. (No model.)

*To all whom it may concern:*

Be it known that I, ARCHIE GERRY HOHENSTEIN, a citizen of the United States, residing at New Haven, in the county of New Haven and State of Connecticut, have invented or discovered certain new and useful Improvements in Steam-Boilers, of which improvements the following is a specification.

The invention described herein relates to certain improvements in that class or kind of water-tube boilers forming the subject-matters of Letters Patent Nos. 661,528 to 661,534, granted to me November 13, 1900; and the invention has for its object a construction wherein suitable water-walls are provided at the sides of the fire-chamber and at intermediate points, as desired.

The invention is hereinafter more fully described and claimed.

Figure 1:
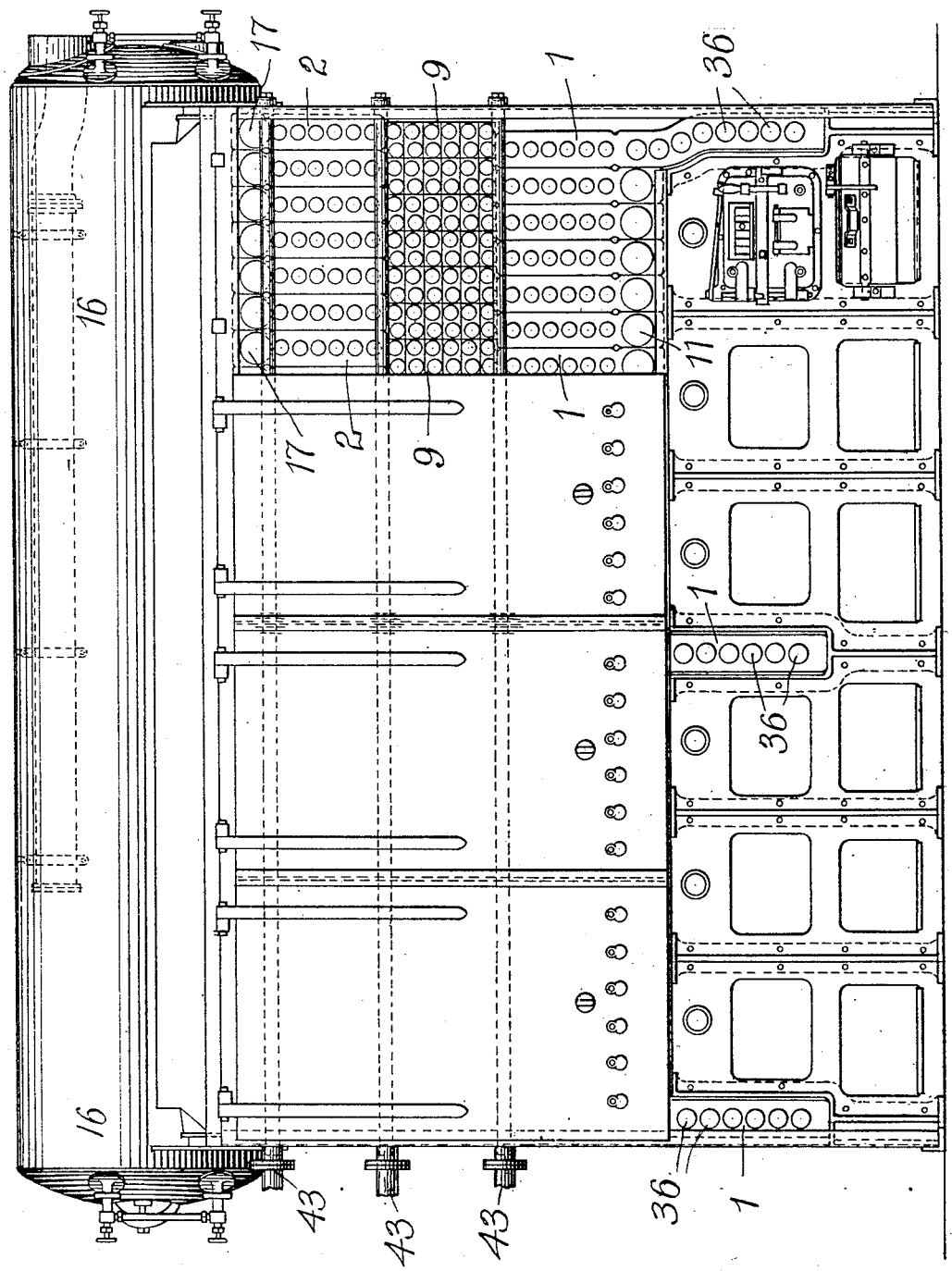
Figure 2:
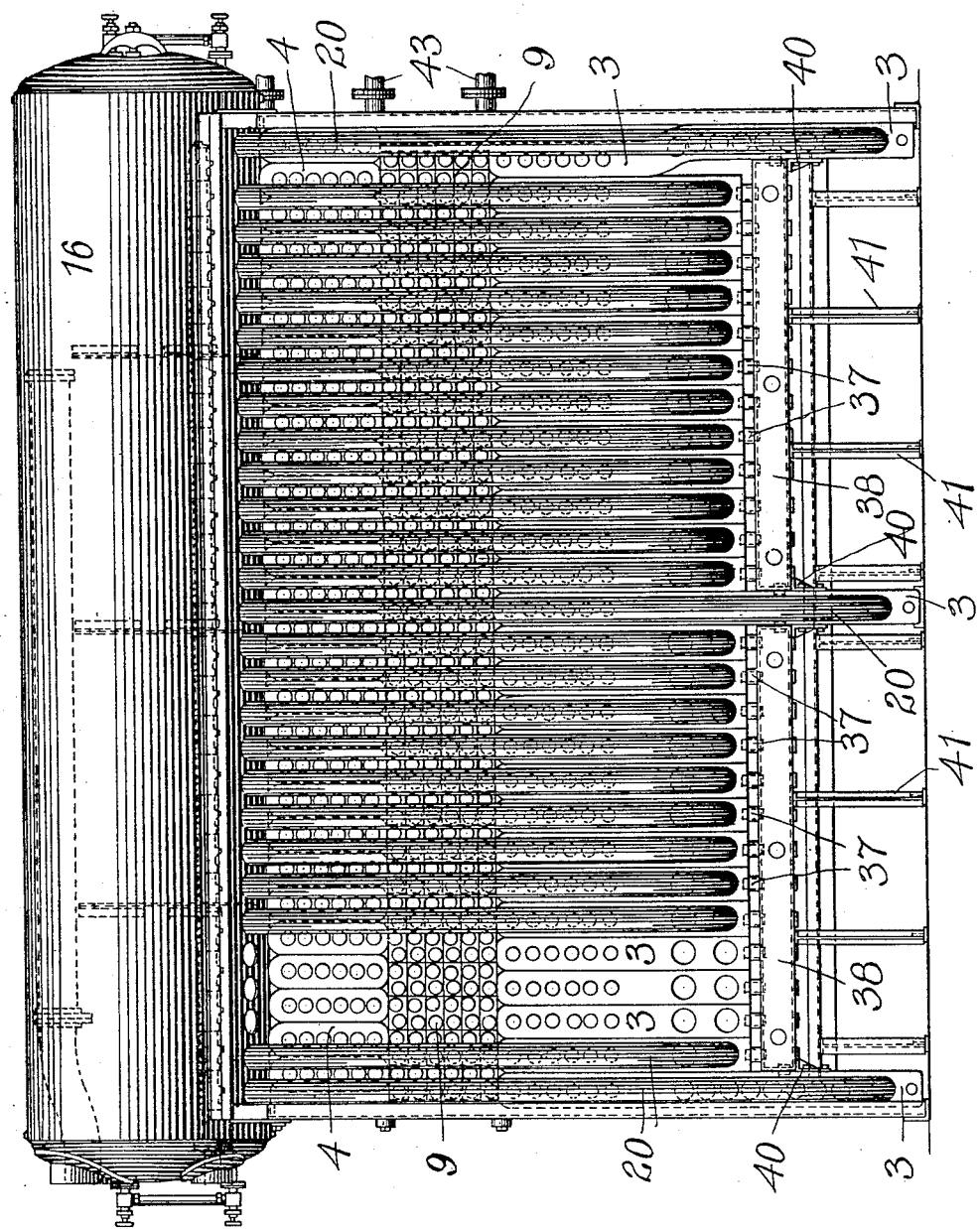
Figure 3:
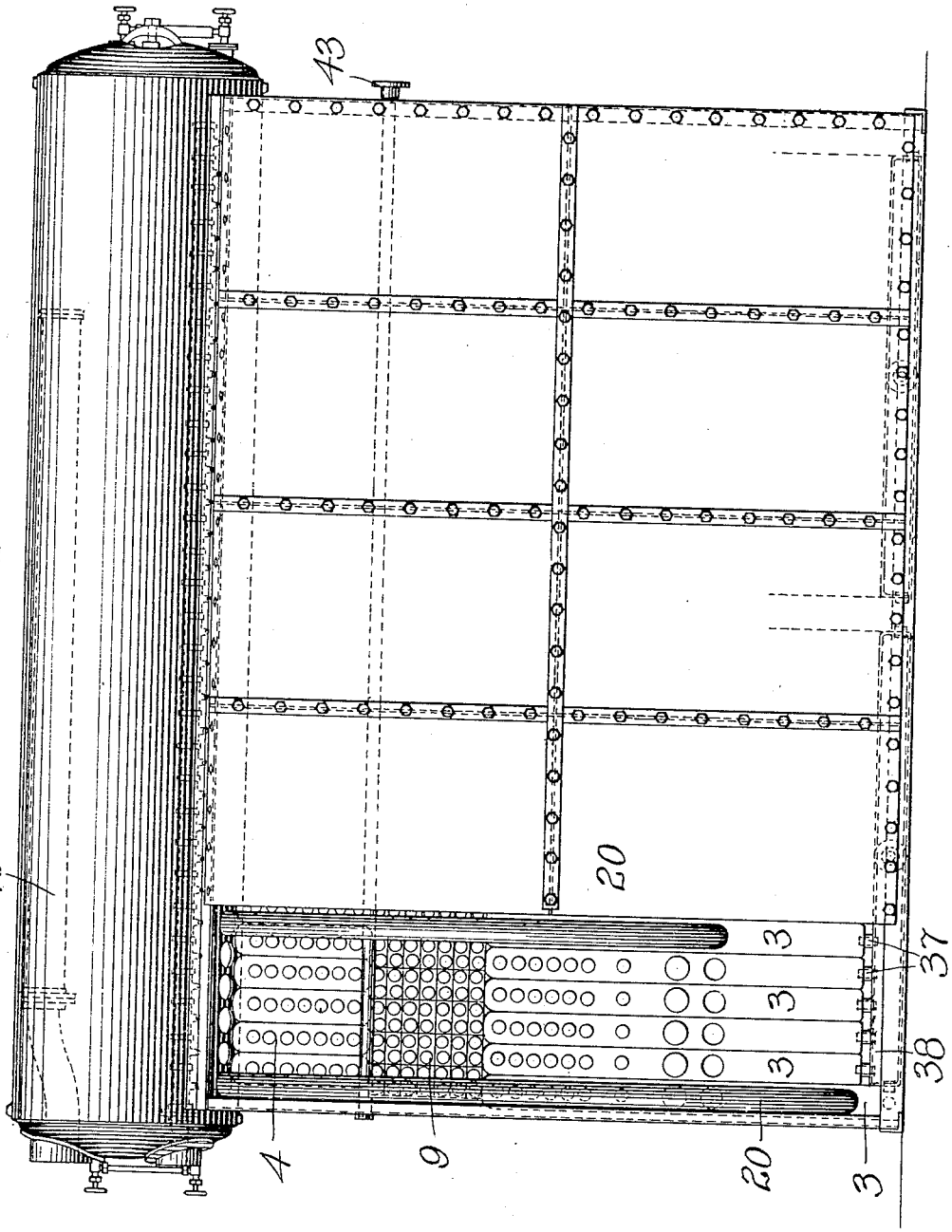
Figure 4:
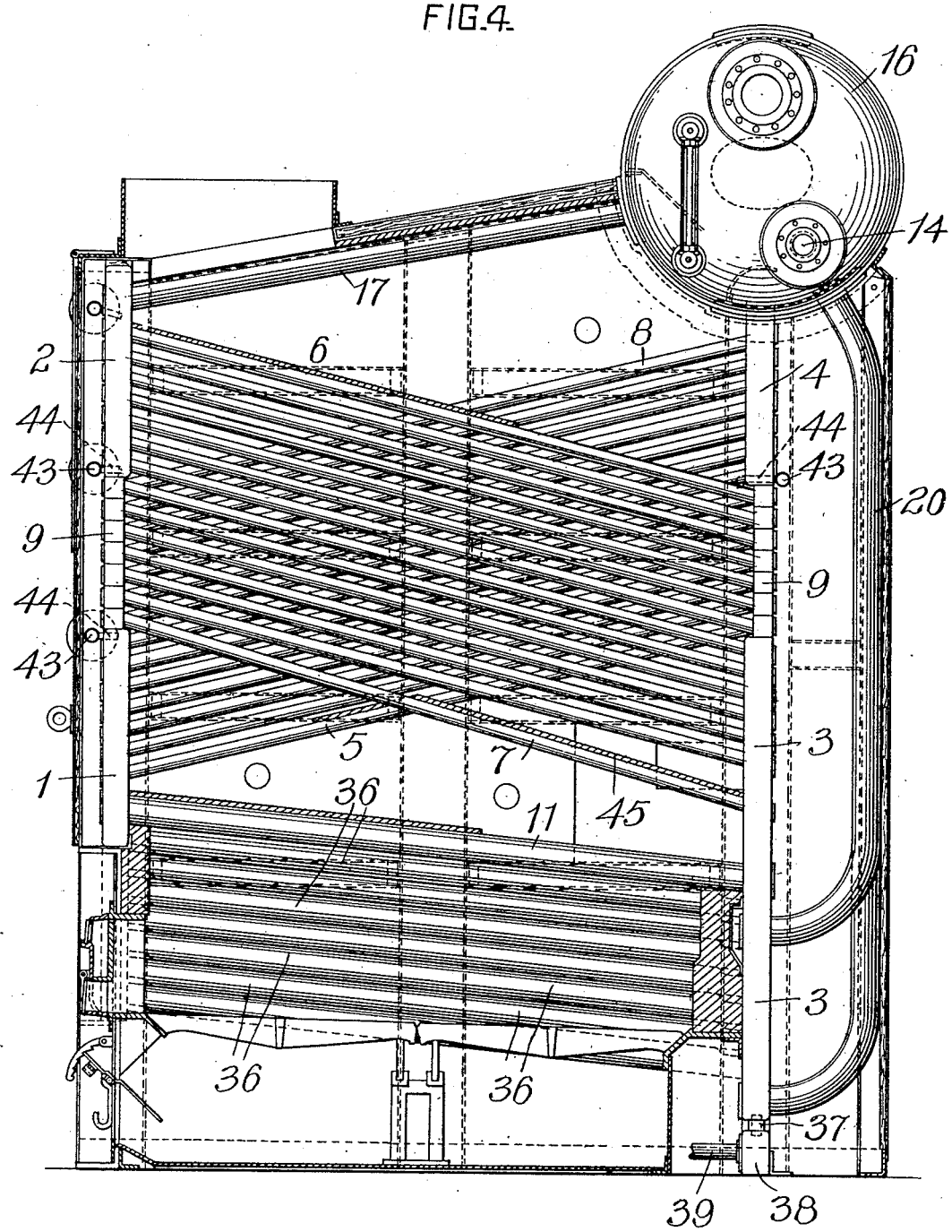
Figure 5:
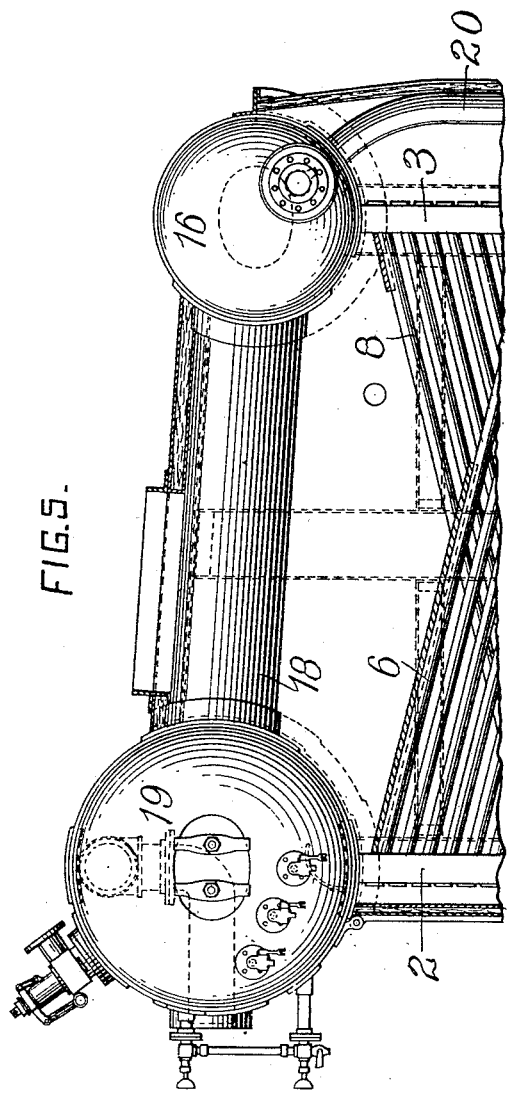
Figure 6:
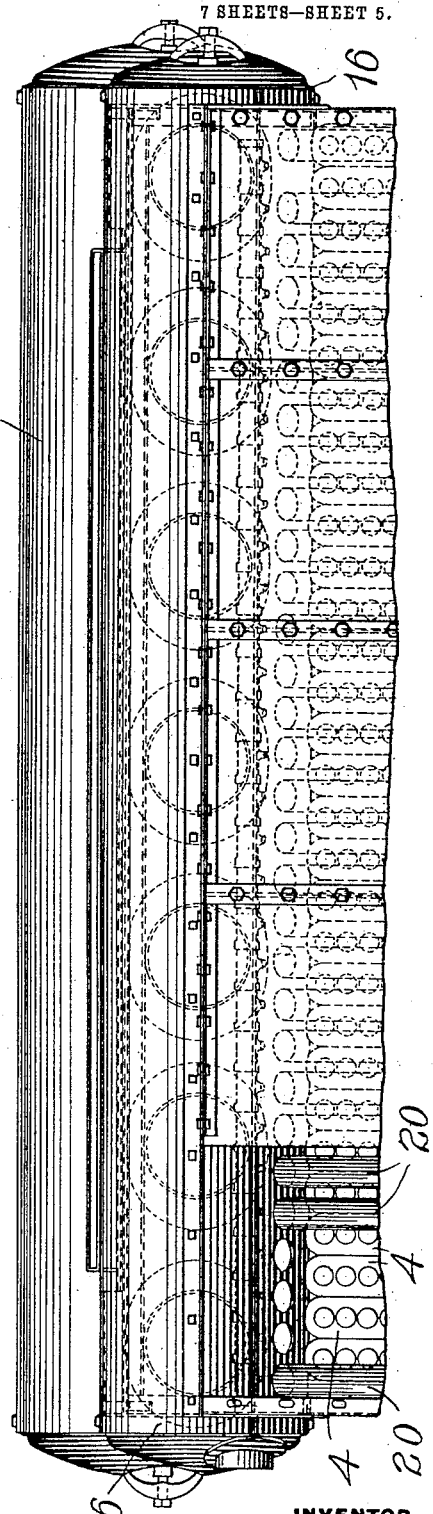

In the accompanying drawings, forming a part of this specification, Figure 1 is a front elevation of a boiler embodying my improvements. Fig. 2 is a rear elevation of the same. Fig. 3 is a view similar to Fig. 2, illustrating a modification in the arrangement of the lower headers and the downtakes and also showing a portion of the inclosing casing. Fig. 4 is a sectional elevation of the construction shown in Fig. 3. Figs. 5 and 6 show a sectional elevation and a rear elevation of a modified form or construction for the upper portion of the boiler. Fig. 7 is a rear elevation of the lower portion of the boiler, illustrating a modification of the construction shown in Fig. 2. Fig. 8 is a side elevation of the portion of the boiler shown in Fig. 7. Figs. 9 and 10 are sectional detail views illustrating the valve between the headers and the equalizing-chambers. Fig. 11 is a rear elevation of the lower portion of the boiler, illustrating a modification in the construction of the headers; and Fig. 12 is a sectional plan view on a plane indicated by the line XII XII, Fig. 11.

In the practice of my invention I employ, as described in the patents referred to, two series of front headers 1 and 2 and two series of rear headers 3 and 4. The lower front headers are connected to the upper front headers by two series of tubes 5 and 6, said tubes extending from their respective headers to the rear of the boiler, where the tubes of one series are connected to those of the other by means of junction-boxes 9. These tubes are made of such a length that the junction-boxes lie in a plane with the upper and lower rear headers. The upper and lower rear headers 3 and 4 are connected by two series of tubes 7 and 8, extending from said headers toward the front of the boiler, where the tubes of one series are connected to those of the other series by junction-boxes 9, arranged in the plane of the front headers. The upper headers 2 are connected by a series of tubes 17 to the upper rear drum 16, and the upper rear headers 4 are connected directly to the same drum. By this construction the two systems of circulation starting from the lower headers 1 and 3 are discharged into a common drum 16, into which the feed-water is discharged through a suitable pipe 14. This drum is connected by a series of downtakes 20 with the respective lower rear headers 3, said headers being in turn connected to the lower ends of the lower front headers 1 by the furnace-tubes 11. By this construction the downtakes 20 serve to supply both systems of circulation, the one starting from the lower rear header 3 and passing by the tubes 7 and 8 to the upper rear header and thence to the drum 16. The other system of circulation starts from the lower rear header 3, and the water passes thence by the furnace-tubes 11 to the lower front header 1, thence by the tubes 5 and 6 to the upper front header, and from this header to the drum by the tubes 17.

In order to form side water-walls for the furnace or fire-chamber of the boiler, the lower front and rear headers at the ends of two series are extended down to or below the level of the grate-bars. All of the lower rear headers may be extended, as shown in Fig. 3, a greater distance to form pockets or receptacles for any solid matter in the circulation. These extensions of the headers at the ends of the series are connected by tubes 36 of such dimensions and so arranged in the headers as to form a practically closed wall at each side of the furnace or fire-box. Where the fire-box is wide, it may be divided into two or more chambers by extending one or more of the intermediate lower front and rear headers to the same distance as the extensions of the end headers and connecting these extensions of the front and rear headers by a similar series of tubes 36, thus dividing the fire-box into chambers and increasing the heating-surface of the boiler. As will be seen by reference to Fig. 2, the downtakes are connected to the extensions of the headers at points below the junction of the tubes 36 with such extensions, so that a full supply of water is assured for these tubes 36, which form parts of the circulating system of the boiler. The intermediate lower rear headers 3 are connected by nipples 37 to equalizing-boxes 38 at their lower ends, and the boxes are in turn connected at their ends to the extended headers by similar nipples. These boxes while not in the circulation serve not only to insure an equal and uniform supply of water to the headers, but also as a receptacle for solid matter in the water. For the removal of the solid matter these boxes are connected, as shown in Figs. 4, 7, and 8, to suitable blow-off pipes 39, a connection being formed by preference through the extended headers. As shown in Fig. 2, the equalizing box or boxes 38 may be supported on brackets 40, secured to the extensions of the headers and also having intermediate supports 41.

As shown in Figs. 3 and 4, all of the headers 3 may be extended down below the junction of the furnace-tubes 11 therewith. In such a construction the equalizing-boxes would be supported by the floor of the fire-room. In order to afford ample space for connecting the tubes 36 with their headers, the latter are preferably made longer than the intermediate headers, extending down along the ends of the equalizing-boxes, as shown in Figs. 3 and 4. As the equalizing-boxes are not designed to form part of the circulating system of the boiler, but are employed simply for equalizing the supply to the headers and as receptacles for solid matter, they need not be connected to the extensions of the headers. For convenience in blowing off, however, the boxes may be connected to the extensions of the end headers, as shown in Figs. 7 and 8. This connection is by preference controlled by valves 42, the stem of said valves extending outside of the header. These valves are to be opened at the same time as the valves in the blow-off pipes 39.

As shown in Figs. 5 and 6, I may use a front upper drum 19, connected directly to the upper front headers and by tubes 18 to the upper rear drum. This construction provides a greatly-increased steam-breaking space, insuring drier steam and a steadier water-level.

As shown in Figs. 1 and 4, pipes 43 are arranged across the front and rear of the boiler, said pipes being provided with nipples or nozzles 44, projecting between adjacent headers. The front pipes, with their nozzles, are so arranged as to blow the dust, &c., from the tubes and the baffle-plates toward the rear of the boiler. The rear pipe has its nozzles so arranged that the dust and dirt forced to the rear of the boiler will be blown down onto the baffle-plate 45, from which the dust, &c., can be removed through an opening formed in the side casing.

It is characteristic of my improved boiler that a deeper fire-box and increase of heating-surface for the same floor-space is provided without interfering with the circulation. The large upper drum 16 insures a full and constant head of water for supplying the downtakes which feed the two circulating systems. The equalizing-boxes perform the principal function of the lower drum of insuring a supply to the circulating systems in case of the stoppage of any of the downtakes.

By reference to Fig. 4 it will be observed that as the tubes composing the two connected series 5 and 6 and also those of the series 7 and 8 have their connected ends alongside of each other the headers in the two lower series must be arranged out of line with those of the two upper series of headers to avoid bending the tubes. As the lower rear headers are offset in one direction, as to the left, as in Fig. 2, and the front headers in the opposite direction or to the right, as in Fig. 1, the furnace-tubes 11 and the water-wall tubes 36, connecting the front and rear lower headers, would extend at an angle across the boiler. In order to avoid this angular arrangement of the tubes 11, the lower ends of the lower series of headers are bent to one side, so as to bring the tubes 11 parallel with the tubes in series 5, 6, 7, and 8 or at right angles to the front of the boiler, as shown in Fig. 12. It is preferred that the entire correction of this angularity should be made by bending the lower rear headers alone, as shown in Fig. 11. While this bending of the lower rear headers will correct the angularity of the tubes 11, it is preferred to bring the water-wall tubes 36 into proper position by bending the extensions of the diagonally opposite end rear and front headers outwardly, as shown in Figs. 1 and 2. It will be observed that the lower rear header at the left-hand end of this series in Fig. 12 is made straight, while the corresponding lower front header is curved outwardly, so that the tube 11 and some of the tubes 36, connecting these headers, are angularly arranged. This construction will prevent any material reduction in width of the fire-box at either end thereof.

I claim herein as my invention—

1. A water-tube boiler having in combination two series of front headers, two connected series of tubes extending in diverging lines from the rear of the boiler to the front headers, two series of rear headers, two connected series of tubes extending from the front of the boiler to the rear headers, water-walls connecting front and rear lower headers and return connections from the upper to the lower series of headers, substantially as set forth.

2. A water-tube boiler having in combination two series of front headers, two connected series of tubes extending in diverging lines from the rear of the boiler to the front headers, two series of rear headers, two connected series of tubes extending in diverging lines from the front of the boiler to the rear headers, two or more of the lower front and rear headers being extended toward or to the level of the grate of the boiler, series of tubes connecting the extensions of the front and rear headers and forming water-walls for the fire-chamber, and return connections from the upper to the lower headers, substantially as set forth.

3. A water-tube boiler having in combination two series of front headers, two connected series of tubes extending in diverging lines from the rear of the boiler to the front headers, two series of rear headers, two connected series of tubes extending in diverging lines from the front of the boiler to the rear headers, the lower front and rear headers at the sides of the boiler being extended to and toward the grate-level, series of tubes connecting the extensions of said headers, the extension of one of the front headers and the diagonal opposite rear header being curved outwardly so as to bring the water-walls at or approximately at right angles to the front of the boiler, substantially as set forth.

4. A water-tube boiler having in combination two series of front headers, two connected series of tubes extending in diverging lines from the rear of the boiler to the front headers, two series of rear headers, two connected series of tubes extending in diverging lines from the rear of the boiler to the front headers, two series of rear headers, two connected series of tubes extending from the front of the boiler to the rear headers, a series of tubes connecting the lower front and rear headers, one of the lower series of headers having their lower ends offset and made parallel or approximately parallel with the corresponding headers at the opposite sides of the boiler, substantially as set forth.

5. A water-tube boiler having in combination two series of front headers, two connected series of tubes extending in diverging lines from the rear of the boiler to the front headers, two series of rear headers, two connected series of tubes extending from the front of the boiler to the rear headers, a series of tubes connecting the lower front and rear headers, the lower rear headers having their lower ends offset thereby bringing the tubes connecting the lower headers parallel or approximately parallel with the other cross-tubes of the boiler, substantially as set forth.

6. A water-tube boiler having in combination two series of front headers, two connected series of tubes extending in diverging lines from the rear of the boiler to the front headers, two series of rear headers, two connected series of tubes extending from the front of the boiler to the rear headers, water-walls connecting front and rear lower headers, an equalizing-box connected to the lower rear headers and return connections from the upper to the lower series of headers, substantially as set forth.

7. In a water-tube boiler the combination of two series of front headers, two connected series of tubes extending in diverging lines from the rear of the boiler to the front headers, two series of rear headers, two connected series of tubes extending in diverging lines from the front of the boiler to the rear headers, a drum arranged above and connected to the upper rear headers, tubes connecting the upper front headers to said drum, downtakes extending from the drum to the lower rear headers, and tubes connecting the lower front and rear headers, substantially as set forth.

8. A water-tube boiler having in combination two series of front headers, two connected series of tubes extending in diverging lines from the rear of the boiler to the front headers, two series of rear headers, two connected series of tubes extending in diverging lines from the front of the boiler to the rear headers, tubes connecting the lower front and rear headers, drums arranged above and connected respectively to the upper front and rear headers, tubes connecting said drums, and tubes connecting the rear drum to the lower headers, substantially as set forth.

9. A water-tube boiler having in combination two series of front headers, two connected series of tubes extending in diverging lines from the rear of the boiler to the front headers, two series of rear headers, two connected series of tubes extending in diverging lines from the front of the boiler to the rear headers, connecting the lower front and rear headers, return connections from the upper to the lower series of headers, and an equalizing-box connected to the lower rear headers outside of the circulation of the boiler, substantially as set forth.

In testimony whereof I have hereunto set my hand.

ARCHIE G. HOHENSTEIN.

Witnesses:
DARWIN S. WOLCOTT,
J. C. DAVIDSON.